United States Patent
Abbasi et al.

(10) Patent No.: US 12,238,054 B2
(45) Date of Patent: Feb. 25, 2025

(54) DETECTING AND MITIGATING MULTI-STAGE EMAIL THREATS

(71) Applicant: Cisco Technology, Inc., San Jose, CA (US)

(72) Inventors: Fahim Abbasi, Auckland (NZ); Abhishek Singh, Morgan Hill, CA (US); Muhammad Sachedina, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 17/699,579

(22) Filed: Mar. 21, 2022

(65) Prior Publication Data

US 2023/0171213 A1 Jun. 1, 2023

Related U.S. Application Data

(60) Provisional application No. 63/284,879, filed on Dec. 1, 2021.

(51) Int. Cl.
*H04L 51/212* (2022.01)
*G06N 20/00* (2019.01)
(Continued)

(52) U.S. Cl.
CPC ............ *H04L 51/212* (2022.05); *H04L 51/42* (2022.05); *H04L 63/1433* (2013.01); *G06N 20/00* (2019.01)

(58) Field of Classification Search
CPC ...... G06N 20/00; G06N 5/022; H04L 51/212; H04L 51/42; H04L 51/02; H04L 63/1433;
(Continued)

(56) References Cited

U.S. PATENT DOCUMENTS 7,844,669 B1 * 11/2010 Mohler ............... G06Q 10/107
709/206
7,917,593 B1 * 3/2011 Lee ..................... G06Q 10/107
709/248
(Continued)

FOREIGN PATENT DOCUMENTS

EP 3547243 A1 10/2019

OTHER PUBLICATIONS

Edwards, Matthew, Claudia Peersman, and Awais Rashid. "Scamming the scammers: towards automatic detection of persuasion in advance fee frauds." Proceedings of the 26th International Conference on World Wide Web Companion. 2017. (Year: 2017).*

(Continued)

*Primary Examiner* — Michael Simitoski
(74) *Attorney, Agent, or Firm* — Lee & Hayes, P.C.

(57) ABSTRACT

Techniques for an email-security system to detect multi-stage email scam attacks, and engage an attacker to obtain additional information. The system may analyze emails for users and identify scam emails by analyzing metadata of the emails. The system may then classify the scam emails into particular classes from among a group of scam-email classes. The system may then engage the attacker that sent the scam email. In some instances, the scam emails may be multi-stage attacks, and the system may automatically engage the attacker to move to the next stage of the scam attack. For instance, the system may send a lure email that is responsive to the particular scam class to prompt or provoke the attacker to send more sensitive information, such as a phone number, a bank account, etc. The system may then harvest this sensitive information of the attacker, and use that information for various remedial actions.

20 Claims, 9 Drawing Sheets

(51) Int. Cl.
*H04L 9/40* (2022.01)
*H04L 51/42* (2022.01)

(58) Field of Classification Search
CPC ............. H04L 63/1483; H04L 63/1491; H04L 63/1441; G06F 40/20; G06F 40/40
See application file for complete search history.

(56) References Cited

U.S. PATENT DOCUMENTS

| | | | | |
|---|---|---|---|---|
| 8,874,658 | B1* | 10/2014 | Khalsa | H04L 51/212 709/206 |
| 10,834,127 | B1 | 11/2020 | Yeh et al. | |
| 10,855,722 | B1* | 12/2020 | Vadlamani | H04L 63/1408 |
| 11,050,698 | B1 | 6/2021 | Batchu et al. | |
| 11,102,244 | B1* | 8/2021 | Jakobsson | H04L 51/42 |
| 11,936,604 | B2* | 3/2024 | Jakobsson | H04L 51/212 |
| 2002/0016824 | A1* | 2/2002 | Leeds | H04L 51/212 709/207 |
| 2005/0141486 | A1* | 6/2005 | Gilchrist | H04L 65/1079 370/352 |
| 2008/0141332 | A1* | 6/2008 | Treinen | H04L 63/1416 726/1 |
| 2016/0119377 | A1* | 4/2016 | Goldberg | H04L 63/1408 726/12 |
| 2017/0223037 | A1* | 8/2017 | Singh | H04L 63/1441 |
| 2017/0223046 | A1* | 8/2017 | Singh | H04L 63/1491 |
| 2018/0159808 | A1* | 6/2018 | Pal | H04L 51/212 |
| 2019/0014064 | A1* | 1/2019 | Strauss | H04L 63/1441 |
| 2019/0149575 | A1 | 5/2019 | Bahrs et al. | |
| 2019/0295091 | A1 | 9/2019 | Vandezande et al. | |
| 2020/0053120 | A1* | 2/2020 | Wilcox | G06F 40/205 |
| 2020/0067861 | A1 | 2/2020 | Leddy et al. | |
| 2020/0344251 | A1 | 10/2020 | Jeyakumar et al. | |
| 2021/0273976 | A1 | 9/2021 | Reiser et al. | |

OTHER PUBLICATIONS

McCoy, Damon, et al. "Case study: Rental scams." Understanding Social Engineering Based Scams (2016): 89-102. (Year: 2016).*

Odemis, Murat, et al. "Suggesting a honeypot design to capture hacker psychology, personality and sophistication." 13th International Conference on Cyber Warfare and Security. Academic Conferences, Washington, DC. 2018. (Year: 2018).*

Zhindon, Manuel. Becoming a Target. Diss. The University of ManchesteR, 2020. (Year: 2020).*

Zhou, Allen. "Bringing the Fight to Them: Exploring Aggressive Countermeasures to Phishing and other Social Engineering Scams" 2018. (Year: 2018).*

A. Zingerle, "How to Obtain Passwords of Online Scammers by Using Social Engineering Methods," 2014 International Conference on Cyberworlds, Santander, Spain, 2014, pp. 340-344, doi: 10.1109/CW.2014.54. (Year: 2014).*

Morovati, et al., "Detection of Phishing Emails with Email Forensic Analysis and Machine Learning Techniques", International Journal of Cyber-Security and Digital Forensics (IJCSDF), Jun. 2019, 10 pages.

PCT Search Report and Written Opinion mailed Mar. 20, 2023 for PCT application No. PCT/US2022/051513, 13 pages.

* cited by examiner

```
BEC_Heuristic_Detect_Gift_Card
{
meta:
    description = "Heuristic to detect BEC gift card scams"
    author = "Fahim"
    type = "verdict"

strings:
    $from_freemail = /(From:|Reply-To:).*(@gmail|@yahoo|@hotmail|@comcast)/ ascii wide nocase
    $sub_hotkeys = /Subject:.*(need|moment|urgent|asap|task|gift|card)/ ascii wide nocase
    $message_id = /Message-ID:.*(gmail|yahoo|hotmail|comcast)/ ascii wide nocase
    $body_keywords = /[^Subject:] (\bplan\b|\bneed\b|\bhelp\b|\basap\b|\bmoment\b|\bimmediate\b|\bquick)/ ascii wide nocase
    $body_buy = /[^Subject:] (\bpurchase\b|\bbuy\b|\bget\b)/ ascii wide nocase
    $body_you = /[^Subject:]\byou\b.*(\bconvenience\b|\bhandle\b|\bavailable\b|\bthere\b|\bassist\b|\bmeet\b|\btalk\ ascii wide nocase
    $body_cards = /[^Subject:] (\bebay\b|\bapple\b|\bitunes\b|\bwalmart\b)/ ascii wide nocase
    $body_gift = /[^Subject:] (\bgift\b|\bgift).*card/ ascii wide nocase
    $body_cardpic = /[^Subject:] (\bpicture\b|\bcard\b).*(\bpicture\b|\bcard\b|\bfront\b|\bback\b)/ ascii wide nocase
    $body_surprisestaff = /[^Subject:]\bsurpris.*(\bstaff\b|\bemployee)/ ascii wide nocase condition:
    $from_freemail and $sub_hotkeys and (($body_keywords or $body_buy) and $body_you) and
    (($body_gift and $body_cards) or ($body_cardpic or $body_surprisestaff)) and $message_id
}
```

RULE-BASED HEURISTIC 220

FIG. 4

```
RET_BEC_bl_email
{
meta:
description = "BEC Blacklisted email of threat actor"
author = "Fahim"

strings:
$bec_email= /(From:|Reply-To:).*director101@comcast.net | directorsoffice@runbox.eu|discreet@exeoffice.net|execgroup@inbox.lv condition:
$bec_email
}

RET_BEC_bl_account
{
meta:
description = "BEC Blacklisted mule account of threat actor"
author = "Fahim"

strings:
$body_available = /(^Subject:] (\bbank\b|\baccount\b)[^\n]{1,30}(\b40105726\b|\b25133784\b|\b53105268\b|\b42334608\b)/ ascii wide nocase condition:
$body_available|
}
```

FIG. 7

DETECTING AND MITIGATING MULTI-STAGE EMAIL THREATS

RELATED APPLICATIONS

This application claims priority to U.S. Provisional Patent Application No. 63/284,879, filed on Dec. 1, 2021, the entire contents of which are incorporated herein by reference.

TECHNICAL FIELD

The present disclosure relates generally to techniques for an email-security system to detect and mitigate email scam attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates an example rule-based heuristic used by an email-security system to detect scam emails.

FIG. 7 illustrates another example rule-based heuristic used by an email-security system to detect scam emails.

DESCRIPTION OF EXAMPLE EMBODIMENTS

Overview

Figure 1:
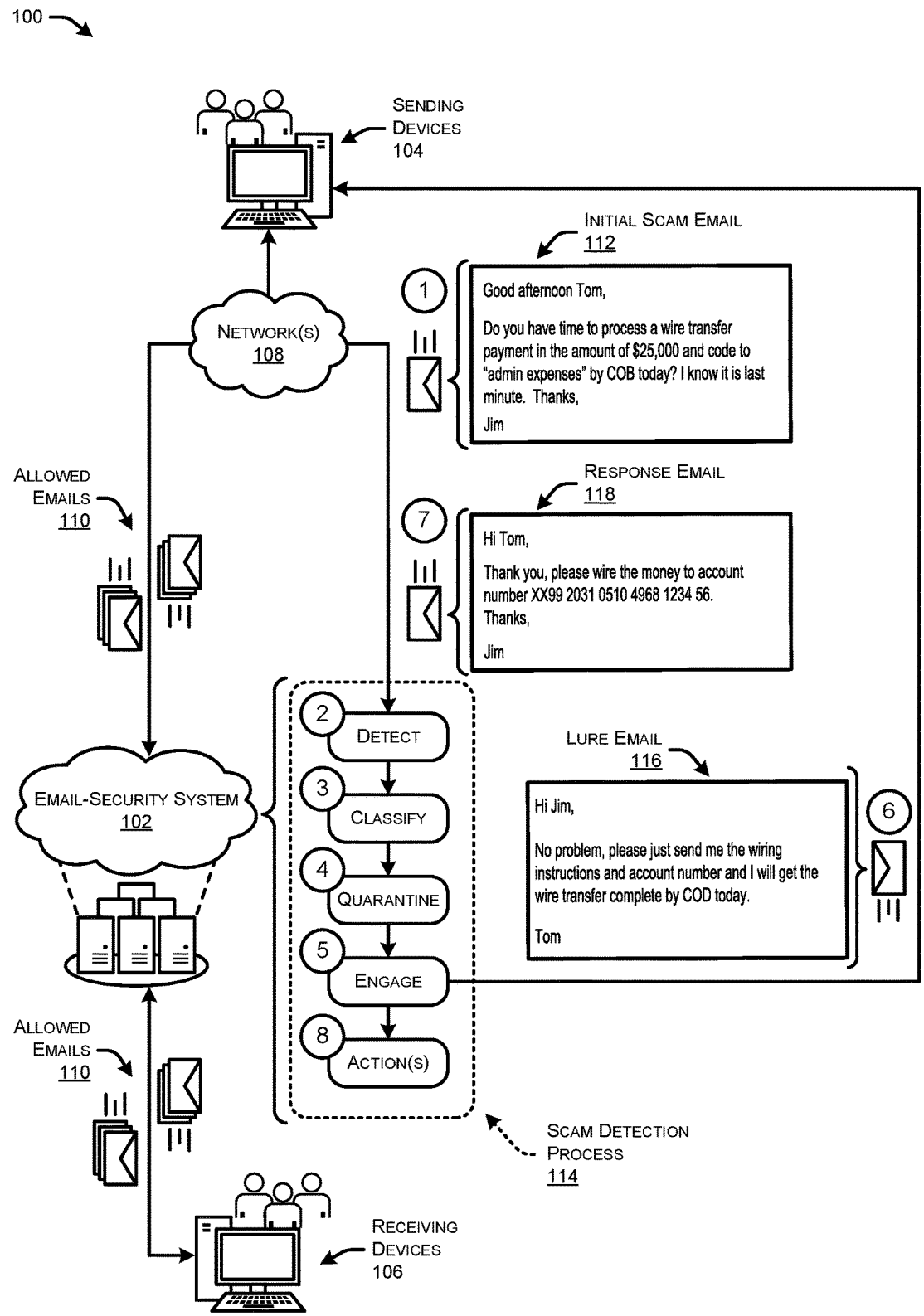
FIG. 1 illustrates a system-architecture diagram of an example email-security system that detects and classifies an email as a scam email, engages an attacker that sent the scam email, and obtains additional information about the attacker.

This disclosure describes techniques for an email-security system to detect and mitigate multi-stage email scam attacks and engage an attacker to obtain additional information. A method to perform the techniques described herein includes obtaining, at the email-security system, a first email sent from a sending email address and to a targeted email address. The method may further include determining that the first email is a scam email that is a scam directed at a targeted user associated with the targeted email address, and classifying the scam email into a particular scam-email class from amongst a group of scam-email classes. Further, the method may include determining, based at least in part on the particular scam-email class, a response that prompts a sending user associated with the sending email address for additional information associated with the scam. Even further, the method may include sending, to the sending email address, a second email that includes the response that prompts the sending user for the additional information associated with the scam, and receiving, from the sending email address, a third email that includes the additional information associated with the scam. In some instances, the third email may be the third email in the conversation, while in other instances, the third email may be received later in the conversation. That is the, the third email need not necessarily be the third email in the sequence of the conversation. The method may further include extracting the additional information from the third email.

Additionally, the techniques described herein may be performed by a system and/or device having non-transitory computer-readable media storing computer-executable instructions that, when executed by one or more processors, performs the method described above.

Example Embodiments

This disclosure describes techniques for an email-security system to detect and mitigate multi-stage email scam attacks and engage an attacker to obtain additional information. The email-security system may analyze emails for users and identify scam emails by analyzing metadata of the emails using rule-based analysis, heuristic analysis, probabilistic analysis, machine-learning (ML) models, and so forth. The email-security system may then classify the scam email into a particular class from amongst a group of scam-email classes, such as a gift-card scam class, a wire-transfer scam class, an invoice scam class, a phone scam class, a W-2 scam class, an aging report scam class, a merger and acquisition scam class, an executive forgery scam class, an attorney scam class, a tax client scam, an initial lure or rapport scam class, and so forth. The scam emails are quarantined, and the email-security system may then engage the attacker that sent the scam email. In some instances, the scam emails may be multi-stage attacks, and the email-security system may automatically engage the attacker to move to the next stage of the scam attack. For instance, the email-security system may send a lure email that is responsive to the particular scam class to prompt or provoke the attacker to send more sensitive information, such as a phone number, a bank account, wiring instructions, etc. The email-security system may then harvest this more sensitive information of the attacker and can use that information for various remedial actions. The remedial actions may include harvesting the attacker information for additional detection rules, blocking the scam email, reporting the attacker information to authorities, and so forth.

While the systems and techniques described herein are generally applicable for any type of malicious email, scam emails (often BEC attacks) are prominent threats that may be detected and mitigated according to the techniques described herein. BEC scam emails include various types or classes, such as wire-transfer scams, gift card scams, payroll scams, invoice scams, acquisition scams, aging report scams, phone scams, a W-2 scam class, an aging report scam class, a merger and acquisition scam class, an executive forgery scam class, an attorney scam class, a tax client scam, an initial hire or rapport scam class, and so forth. In some instances, the scam attacks result in an organization or person under attack losing money or other financial resources. Additionally, or alternatively, the organization or person under attack may lose valuable information, such as trade secrets or other information. These types of scams are often multi-stage attacks. Often, in the first stage, the attacker sends a fake email to the victim who is usually a manager or employee in the organization. This fake email may impersonate a real person who is also a legitimate employee of an organization to build a rapport and an official tone to the message. Once the victim succumbs to the scam and responds to the initial scam email, the attacker then sends a subsequent email usually with directions on how to, for example, transfer money to the attacker, either in the form of transfer to a bank account or sending gift card credentials to an email address.

Rather than simply identifying and blocking the initial emails, as many security systems do, the techniques described here include techniques for deceiving an attacker into revealing both first stage and secondary stage attack information like email, phone number, and bank account details. This additional information can be used for various purposes, such as creating threat intel that can be used to mitigate any current or future threats to any organization that subscribes to this service. Generally, it is fairly easy for a threat actor to change email addresses but changing a bank account adds overhead to its operations. Further, the techniques may include identifying a geolocation of the threat actor. For example, if a threat actor is using Brank State Branch (BSB) codes, his geolocation may be in Australia. Australian Banking system use BSB codes, and information such as fraudulent or compromised account numbers can be shared with law enforcement, banks to disrupt the BEC frauds.

Thus, the email-security system may monitor emails communicated between users of email platforms or services to detect scam emails, phishing emails, and/or other malicious emails. The email-security system may extract meaningful metadata from emails to determine whether the emails are scam emails or otherwise malicious. Meaningful metadata may include, for example, indications of a "To" address for the email, a "From" address for the email, a "Subject" of the email, a Date/Time the email was communicated, attachments and/or hashes of attachments to the email, URLs in the body of the email, and so forth. In some instances, the metadata may additionally, or alternatively, include content included in the body of the email, actual attachments to the email, and/or other data of the email that may be private or confidential. Further, the metadata extracted from the email may generally be any probative information for the email security platform to determine whether an email is potentially malicious.

In some instances, rule-based heuristics may be developed to identify malicious emails based on different words, patterns, and/or other information included in the emails. As another example, ML model(s) may be trained using emails where malicious emails are labeled as malicious and benign or normal emails are labeled as benign. The ML model(s) and/or the rule-based heuristics may output probabilities that emails are malicious, or may simply output a positive or negative result as to whether the emails are malicious or not.

The email-security system may be configured to identify scam emails, which are often multi-stage attacks where multiple emails are sent from the attackers to facilitate the scam. For instance, an initial email may be sent from the attacker that includes a request for the target user to perform an action based on the type of scam. For instance, the initial email may request a gift card code, may request a wire transfer, may request that salary be deposited into a different bank account, list of unpaid invoices, W-2 details of employee(s), sensitive information of clients, and so forth. Accordingly, multi-stage scam emails may be grouped into different classes.

After detecting a scam email, the email-security system may classify the scam emails into different classes from amongst a group of scam email classes. For instance, scam emails may be classified into one or more of a gift-card scam class, a wire-transfer scam class, a payroll-account scam class, an invoice scam class, an account-acquisition scam class, a phone scam class, a W-2 scam class, an aging report scam class, a merger and acquisition scam class, an executive forgery scam class, an attorney scam class, a tax client scam, an initial lure or rapport scam class, and so forth. The email-security system may utilize a secondary classification scan using email policies. The scam emails may be tested against models, such as natural language processing (NLP)

model(s), to classify the scam emails. The NLP model(s) predict the correct class of the scam email and assigns a class to the scam email.

Once a scam email has been detected and classified into its respective category, it will get quarantined and not sent to an inbox of the target user. The email-security system may then engage the attacker by utilizing an ML algorithm and/or a probabilistic algorithm to determine replies for the initial scam email in order to lure the attacker into revealing additional information about the final part of the attack. The additional information could be in the form of an email address, a phone number, a bank account number, a crypto wallet, and so forth. The response may be built using various models, such as artificial intelligence (AI) models, or the email-security system may select the best response from a response space. The email-security system may then automatically send the response email without knowledge of the target user.

The attacker may receive the response sent from the email-security system, and may send a response email back that is the next/final phase of the multi-phase scam attack. For instance, the response email may include a request that the targeted user wire money to a specific account, send a text message with a gift card code to a specific phone number, and so forth. The email-security system may block the scam email, and may further harvest the additional information for various reasons. For instance, the email-security system may create an additional block rule and/or train an ML model to block subsequent emails having the additional attacker email. In this way, subsequent emails from the attacker may be blocked in any phase of a multi-phase scam attack. Additionally, or alternatively, the email-security system may harvest the information and provided to various entities to prevent the attacker from performing further attacks (e.g., law enforcement, bank employees, etc.). Further, the scam email is blocked and dropped such that the target user does not receive the scam email.

The techniques of this application improve the effectiveness of email-security system by automatically engaging attackers and harvesting additional information in order to generate more accurate and more robust detection systems for detecting malicious emails. Often, email-security systems simply block malicious emails. However, the email-security systems described herein lure attackers to provide additional information in subsequent attack emails of a multi-stage attack. In this way, later stages of an email attack are also detected by the email-security system, and the detection/blocking components of the email-security system are improved Some of the techniques described herein are with reference to scam emails. However, the techniques are generally applicable to any type of malicious email. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a recipient and/or destination email address associated with an email communication.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example email-security system 102 that detects and classifies an email as a scam email, engages an attacker that sent the scam email, and obtains additional information about the attacker.

In some instances, the email-security system 102 may be a scalable service that includes and/or runs on devices housed or located in one or more data centers, that may be located at different physical locations. In some examples, the email-security system 102 may be included in an email platform and/or associated with a secure email gateway platform. The email-security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email-security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email-security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email-security system 102 may be included in, or associated with, the email service platform. For instance, the email-security system 102 may provide security analysis for emails communicated by the email service platform (e.g., as a secure email gateway). As noted above, the second computing infrastructure 104 may comprise a different domain and/or pool of resources used to host the email security platform 112.

The email service platform may provide one or more email services to users of user device to enable the user devices to communicate emails over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include sending devices 104 that send emails and receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive emails that are destined the receiving device 106 that have access to inboxes associated with destination email addresses managed by, or provided by, the email service platform. That is, emails are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email-security system 102, an organization managing the user devices 104/106 has registered for use of the email-security system 102, and/or the email service platform itself has registered for use of the email-security system 102, the email service platform may provide the appropriate emails to the front end 114 for pre-preprocessing of the security analysis process.

Generally, the email-security system 102 may perform at least metadata extraction techniques on the emails, and may further perform content pre-classification techniques on the emails in some instances. The types of metadata that may be scanned for, and extracted by, the email-security system 102 includes indications of the "To" email address(es), the "From" email address(es), the "Subject" of the emails 120, the Date/Time associated with communication of the emails, indications of universal resource locators (URLs) or other links in the emails, attachment files, hashes of attachments, fuzzy hashes extracted from the message body of the emails, content from the body of the email, etc. Generally, the email service platform and/or users of the email security platform may define what information is permitted to be scanned and/or extracted from the emails, and what information is too private or confidential and is not permitted to be scanned and/or extracted from the emails.

Upon extracting metadata (or "features") from the emails that is to be used for security analysis, the email-security system 102 may perform security analysis on the email metadata using, among other techniques, security policies defined for the email security platform. The security policies may be defined or created by the email-security system 102 to detect potentially malicious emails, and/or be defined and/or created by administrators or other users of the email-security system 102. The email security platform 112 may analyze the email metadata with reference to the security policies to determine whether or not the email metadata violates one or more security policies that indicate the respective email is potentially malicious. In some instances, rule-based heuristics may be developed to identify malicious emails based on different words, patterns, and/or other information included in the emails. As another example, ML model(s) may be trained using emails where malicious emails are labeled as malicious and benign or normal emails are labeled as benign. The ML model(s) and/or the rule-based heuristics may output probabilities that emails are malicious, or may simply output a positive or negative result as to whether the emails are malicious or not.

The email-security system 102 may analyze and detect non-malicious emails, or allowed emails 110, and permit the allowed emails 110 to be communicated between the user devices 104/106. However, in some instances the email-security system 102 analyzes emails and detects that the emails are in fact malicious emails, such as scam emails As shown, the email-security system 102 may detect at "1" an initial scam email 112 that is sent from a sending device 104 (e.g., attacker) and to a receiving device 106 (e.g., target, victim, etc.). After detecting the initial scam email 112, the email-security system 102 may, at "2," classify the initial scam email 112 into a particular class from amongst a group of predefined scam email classes. For instance, scam emails may be classified into one or more of a gift-card scam class, a wire-transfer scam class, a payroll-account scam class, an invoice scam class, an account-acquisition scam class, a phone scam class, and so forth. The email-security system may utilize a secondary classification scan using email policies. The initial scam email 112 may be tested against models at "3," such as natural language processing (NLP) model(s), to classify the initial scam email 112 into a particular class. The NLP model(s) predict the correct class of the scam email and assigns a class to the scam email.

In the illustrated example, the initial scam email 112 is a request for the target user to send a wire transfer in the amount of $25,000. The attacker may have determined the name of an employee of the company that is permitted to request such types of wire transfers (e.g., executive, owner, etc.) and pretend to be the person, in this case "Tom." However, as shown the initially scam email 112 does not include any information around to what account the target user ("Jim") is to wire the money.

After classifying the initial scam email 112 as a wire-transfer scam, the email-security system 102 may, at "4," quarantine the initial scam email 112 to ensure that the email 112 is not sent to the receiving device 106 on which Jim is reading emails. At "5," the email-security system 102 may engage the attacker by determining, generating, and sending a lure email 116. In some instances, the email-security system 102 may engage the attacker by utilizing an ML algorithm and/or a probabilistic algorithm to determine replies for the initial scam email 112 in order to lure the attacker into revealing additional information about the final part of the attack. The additional information could be in the form of an email address, a phone number, a bank account number, and so forth. The lure email 116 may be built using various models, such as artificial intelligence (AI) models, or the email-security system 102 may select the best response from a response space. For instance, the email-security system 102 may utilize a bag-of-words model to identify the best response for the lure email 116. The email-security system 102 may then automatically send the response email without knowledge of the target user. As illustrated the lure email 116 in this example may be an affirmation that Tom will in fact do the wire transfer, and the lure email 116 further includes a request for the wiring instructions and account number to which the wire transfer is to be sent.

The attacker may receive and read the lure email 116, and at "7," send a response email 118 that includes the wiring information. As shown, the response email 118 includes an indication of what account the money is to be wired. At "8," the email-security system 102 may determine one or more actions to take based on the contents of the response email 118. For instance, the email-security system 102 may harvest the additional information (e.g., account number, phone number, address, crypto wallet, sender's address, geolocation information, etc.) and use that information for various remedial actions. The remedial actions may include harvesting the attacker information for additional detection rules, training ML model(s) to identify the information as scam, blocking the scam email, reporting the attacker information to authorities, and so forth. Further, the email-security system 102 will block the response email 118 (e.g., drop) such that the email 118 is not sent to the target receiving device 106.

Figure 2:
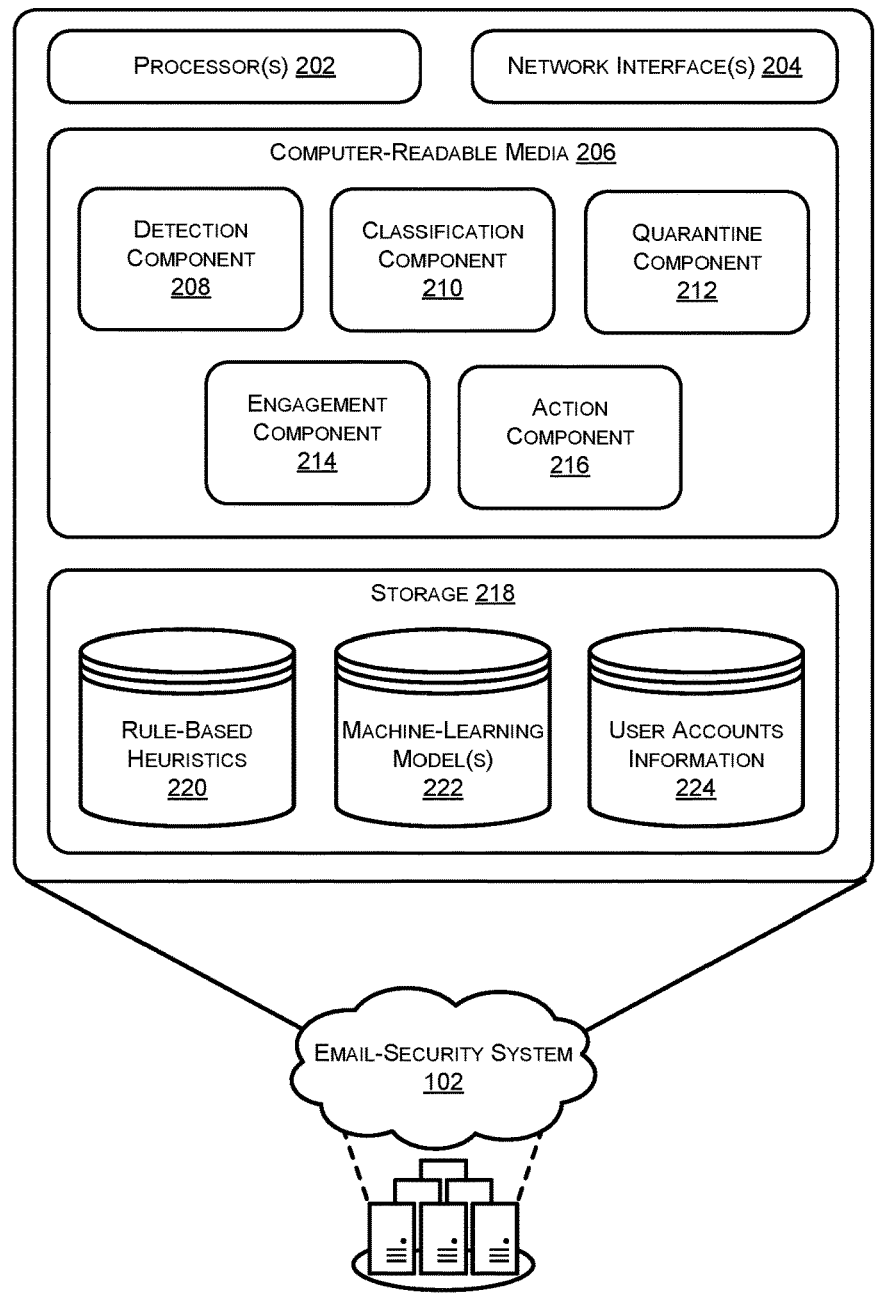
FIG. 2 illustrates a component diagram of an example email-security system that detects and classifies scam emails and engages the attackers for additional information.

FIG. 2 illustrates a component diagram 200 of an example email-security system 102 that detects and classifies scam emails and engages the attackers for additional information. As illustrated, the email-security system 102 may include one or more hardware processors 202 (processors), one or more devices, configured to execute one or more stored instructions. The processor(s) 202 may comprise one or more cores. Further, the email-security system 102 may include one or more network interfaces 204 configured to provide communications between the email-security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email-security system 102 may also include computer-readable media 206 that stores various executable components (e.g., software-based components, firmware-based components, etc.). The computer-readable-media 206 may store components to implement functionality described herein. While not illustrated, the computer-readable media 206 may store one or more operating systems utilized to control the operation of the one or more devices that comprise the email-security system 102. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include storage 218 which may comprise one, or multiple, repositories or other storage locations for persistently storing and managing collections of data such as databases, simple files, binary, and/or any other data. The storage 218 may include one or more storage locations that may be managed by one or more storage/database management systems.

The computer-readable media 206 may include portions, or components, that configure the email-security system 102 to perform various operations described herein. For instance, a detection component 208 may be configured to, when executed by the processor(s) 202, perform various techniques for analyzing emails to detect malicious emails. The detection component 208 may be use various rule-based heuristics 220 and/or ML model(s) 222 to detect malicious emails, such as scam emails. The detection component 208 may utilize policies or rules to analyze email metadata to determine if the corresponding email is malicious. The detection component 208 may perform various types of security analysis techniques, such as determining whether one or more of the following:

"From," "To", "Cc," and/or "Bcc" email addresses are associated with malicious email addresses or email domains;

"Subject" line content of the email metadata is associated with malicious words, symbols, phrases, languages, etc.;

Dates and/or times at which one or a group of emails (e.g., mass spam emails) indicate malicious emails;

IP addresses associated with a sender of the email(s) are known malicious IP addresses or associated with malicious domains;

URLs are associated with malicious sites, domains, and/or other network-assessable destinations; and/or Content or hashes of content of the email is associated with malicious hashes of content known to be malicious.

However, the above-noted list is merely exemplary, and other types of security policies may be used to analyze the email metadata. The detection component 208 may then generate result data indicating a result of the security analysis of the email metadata using the policy(ies) stored in the storage 218.

A classification component 210 may classify the scam emails into one or more of different predefined scam-email categories. An engagement component 214 may be configured to perform the techniques described herein for engaging attackers by determining appropriate responses to the different classes of scam emails and sending lure emails such that the attackers will respond with additional information. The action component 216 may determine various actions to take with respect to scam emails according to the techniques described herein.

Figure 3:
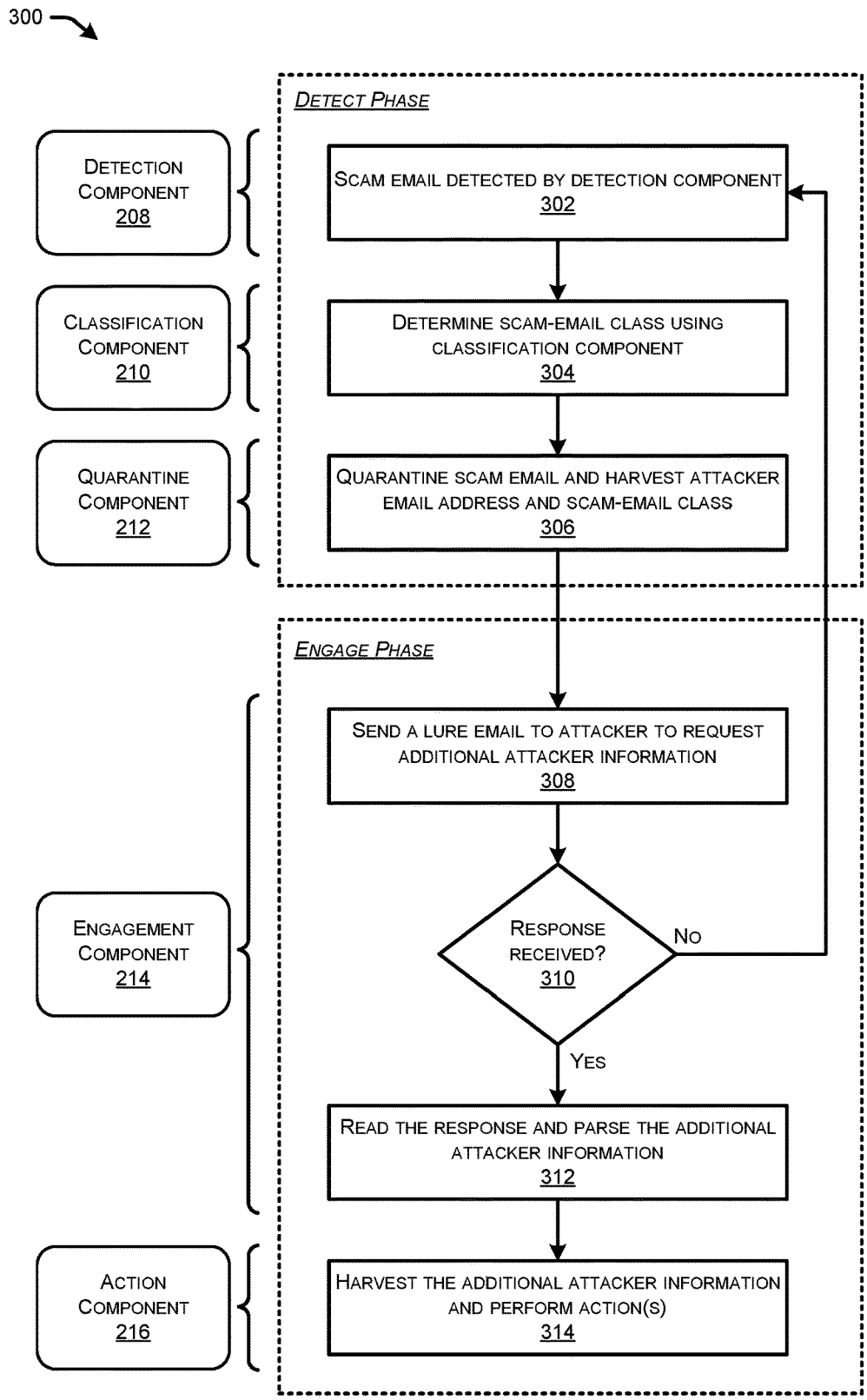
FIG. 3 illustrates a flow diagram of an example method for an email-security system to detect a scam email and engage an attacker that sent the scam email for additional information about the attacker.

FIG. 3 illustrates a flow diagram of an example method 300 for an email-security system 102 to detect a scam email and engage an attacker that sent the scam email for additional information about the attacker. The email-security system 102 may monitor emails communicated between users of email platforms or services to detect scam emails, phishing emails, and/or other malicious emails.

At 302, the detection component 208 may detect a scam email being sent from an attacker and to a potential victim. The detection component 208 may use rule-based heuristics to identify the scam email based on different words, patterns, and/or other information included in the email. As another example, the detection component 208 may use ML model(s) to determine that the email is a scam.

After detecting the scam email, the classification component 210 may classify the scam email into a class from amongst a group of scam email classes. For instance, the classification component 210 may classify the scam email into one or more of a gift-card scam class, a wire-transfer scam class, a payroll-account scam class, an invoice scam class, an account-acquisition scam class, a phone scam class, and so forth. The classification component 210 may, at 304, utilize a secondary classification scan using email policies. The scam email may be tested against models, such as natural language processing (NLP) model(s), by the classification component 210 to classify the scam email. The NLP model(s) predict the correct class of the scam email and assigns a class to the scam email. Once a scam email has been detected and classified into its respective category, the classification component 210 may, at 306, quarantines the scam email and it is not sent to an inbox of the target user.

At 308, the engagement component 214 may then engage the attacker by utilizing an ML algorithm and/or a probabilistic algorithm to determine replies for the initial scam email in order to lure the attacker into revealing additional information about the final part of the attack. The engagement component 214 may send the lure email to the attacker to request the additional information.

At 310, the attacker may receive the response sent from the email-security system 102, and may send a response email back that is the next/final phase of the multi-phase scam attack. For instance, the response email may include a request that the targeted user wire money to a specific account, send a text message with a gift card code to a specific phone number, and so forth.

At 312, the engagement component 214 may read the response email and parse the additional attacker information. That is, the engagement component 214 may harvest the additional information for various reasons. At 314, the action component 216 may take one or more actions, such as creating an additional block rule and/or train an ML model to block subsequent emails having the additional attacker email. In this way, subsequent emails from the attacker may be blocked in any phase of a multi-phase scam attack. Additionally, or alternatively, the action component 216 may harvest the information and provided to various entities to prevent the attacker from performing further attacks (e.g., law enforcement, bank employees, etc.). Further, the scam email is blocked and dropped such that the target user does not receive the scam email.

FIG. 4 illustrates an example rule-based heuristic 220 used by an email-security system 102 to detect scam emails. More specifically, the illustrated rule-based heuristic 220 may be used by the email-security system 102 to detect gift-card scam emails. The rule-based heuristic 220 may include rules that are applied to emails and, upon matches with the rules (and/or matches above a threshold), the email-security system 102 may determine that an email is a gift-card scam email. As illustrated, the heuristic 220 may include rules that look for particular words (such as nouns, verbs, etc.) that are often found in gift-card scams, such as "asap," "urgent," "card," and so forth.

Figure 5:
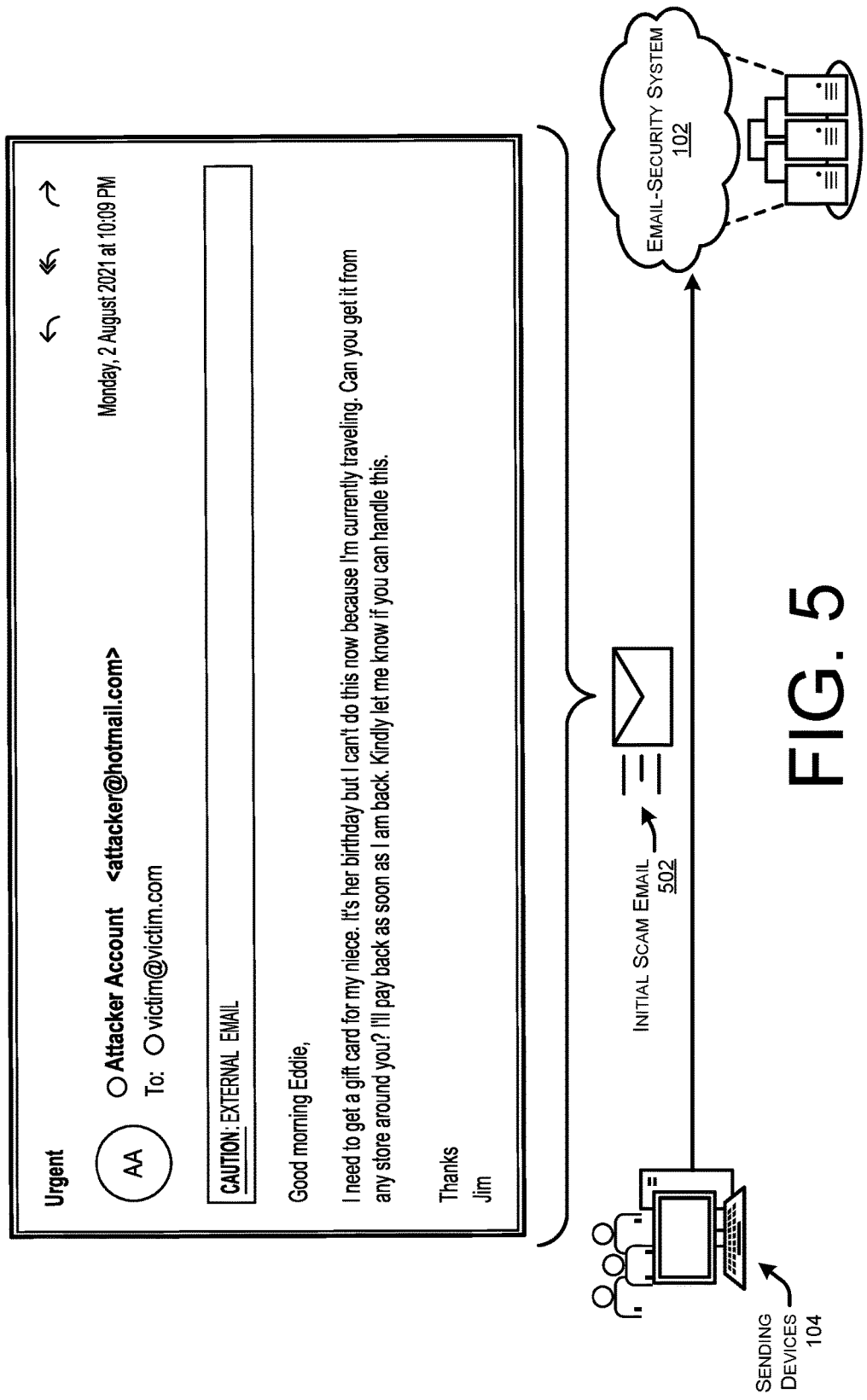
FIG. 5 illustrates an example of a scam email that is detected by an email-security system.

FIG. 5 illustrates an example 500 of an initial scam email 502 that is detected by an email-security system 102. As shown, the initial scam email 502 illustrated is a gift-card scam email where an attacker is pretending to be someone that the victim/target knows. The email 502 includes a request for a gift card. In this example, the heuristic 220 shown in FIG. 4 would be used by the email-security system 102 to detect and classify the email as a scam email of a gift-card scam classification. For instance, the heuristic 220 may detect and/or classify words such as "gift card," "as soon as I can," "birthday," "need," and so forth.

Figure 6:
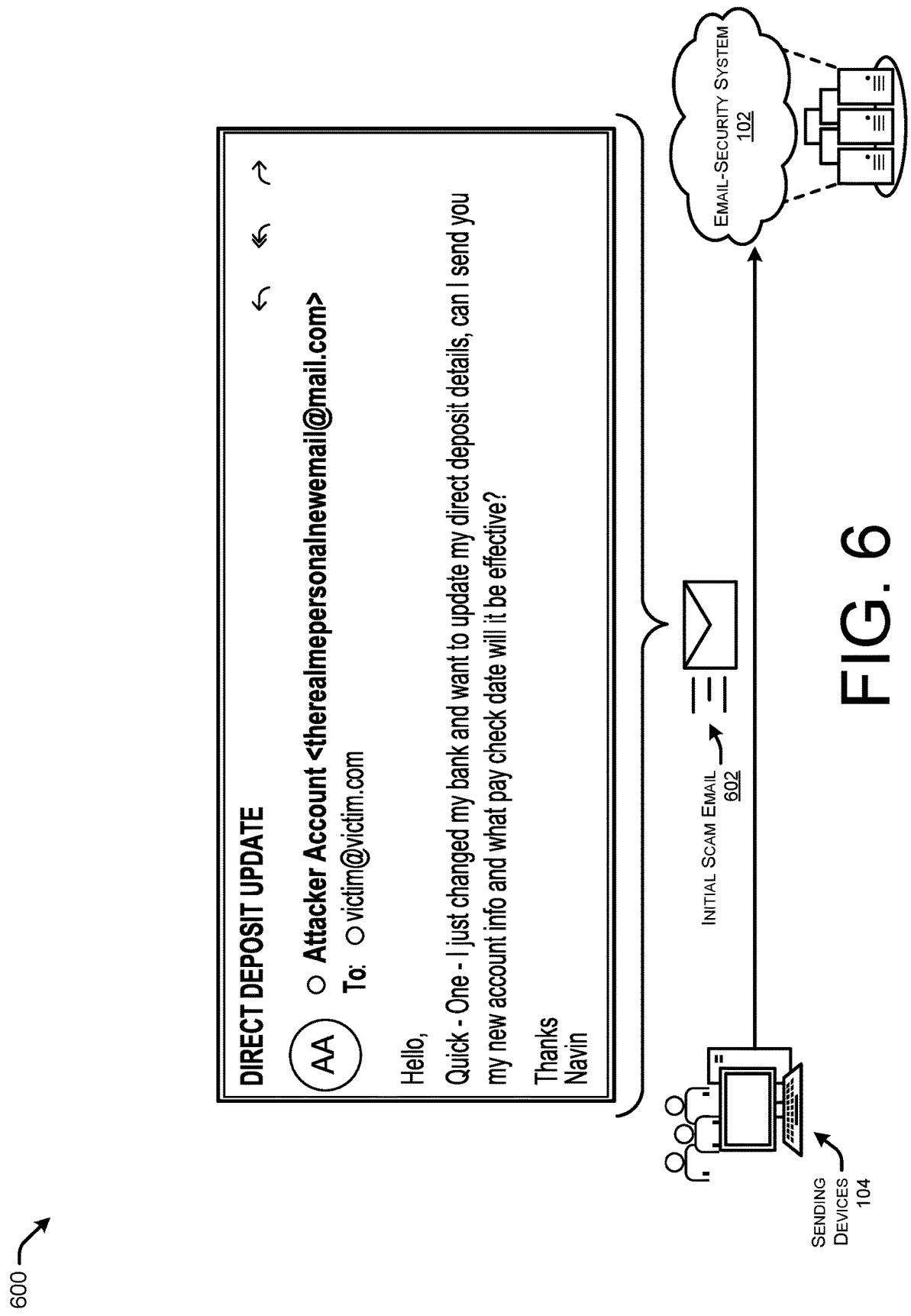
FIG. 6 illustrates another example of a scam email that is detected by an email-security system.

FIG. 6 illustrates another example of a scam email that is detected by an email-security system 102. In this example, the email-security system 102 may use a rule-based heuristic 220 and or a ML model 222 to detect and/or classify the initial scam email 602. The email-security system 102 may detect words such as "bank," "direct deposit," "account info," "check," and so forth to determine that the email is an initial scam email 602 and that the class is a direct-deposit class.

FIG. 7 illustrates another example rule-based heuristic used by an email-security system to detect scam emails. More specifically, the illustrated rule-based heuristic 220 may be used by the email-security system 102 to detect and block fraudulent bank account numbers, and email addresses, of one or more threat actors (e.g., attackers).

Figure 8:
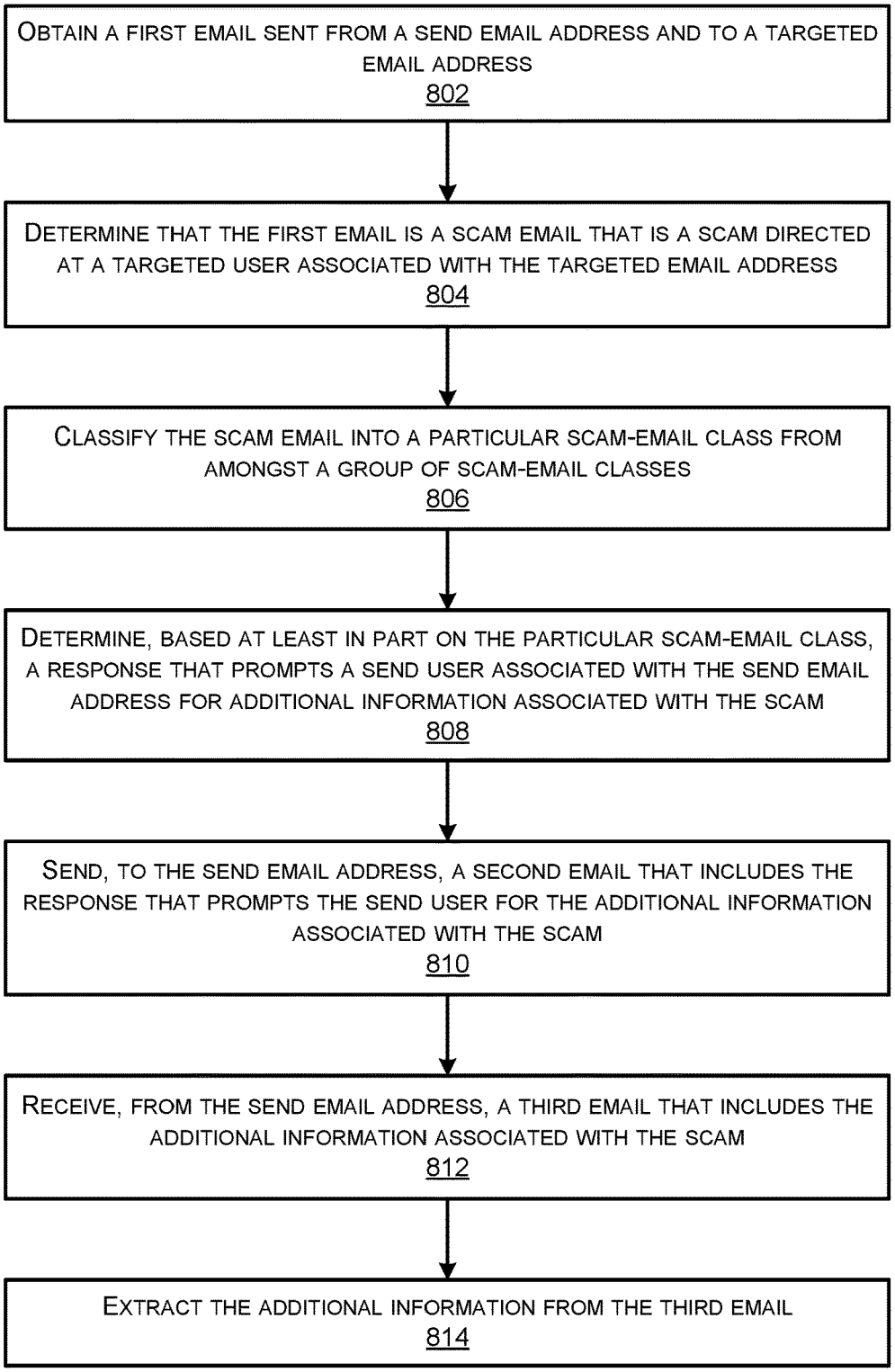
FIG. 8 illustrates a flow diagram of an example method for an email-security system to detect a scam email and engage an attacker that sent the scam email for additional information about the attacker.

FIG. 8 illustrates a flow diagram of an example method 800 that illustrates aspects of the functions performed at least partly by the devices in the computing infrastructures as described in FIGS. 1-7. The logical operations described herein with respect to FIG. 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 8 illustrates a flow diagram of an example method for an email-security system to detect a scam email and engage an attacker that sent the scam email for additional information about the attacker. The techniques may be applied by a system comprising one or more processors, and one or more non-transitory computer-readable media storing computer-executable instructions that, when executed by the one or more processors, cause the one or more processors to perform operations of method 800.

At 802, an email-security system 102 may obtain a first email sent from a sending email address and to a targeted email address. For instance, the email-security system 102 may monitor emails communicate by an email service platform and obtain a first email.

At 804, the email-security system 102 may determine that the first email is a scam email that is a scam directed at a targeted user associated with the targeted email address. For instance, the detection component 208 may analyze data of the first email to determine that the first email is a scam email directed at the target user.

At 806, the email-security system 102 may classify the scam email into a particular scam-email class from amongst a group of scam-email classes. The group of scam-email classes includes at least two of a gift-card scam class, a wire-transfer scam class, a payroll-account scam class, an invoice scam class, an account-acquisition scam class, a W-2 scam class, an aging report scam class, a merger and acquisition scam class, an executive forgery scam class, an attorney scam class, a tax client scam, an initial lure or rapport scam class, or a phone scam class.

At 808, the email-security system 102 may determine, based at least in part on the particular scam-email class, a response that prompts a sending user associated with the sending email address for additional information associated with the scam. For instance, the engagement component 214 may utilize a machine-learning (ML) system trained to simulate conversations with users to generate the response based at least in part on content in a body of the first email, or select the response from a response space of predefined responses based at least in part on the response being responsive to the particular scam-email class.

At 810, the email-security system 102 may send, to the sending email address, a second email that includes the response that prompts the sending user for the additional information associated with the scam. For instance, the email-security system 102 may send a lure email 116 to the sending user (e.g., attacker).

At 812, the email-security system 102 may receive, from the sending email address, a third email that includes the additional information associated with the scam. For instance, the email-security system 102 may receive the response email 118. In some instances, the third email that includes the additional information may be the third email in the conversation, but it may also be a later email in the conversation. That is, the third email may be the fourth email, fifth email, or any other email in the conversation. In some instances, multiple emails may include the additional information as well.

At 814, the email-security system 102 may extract the additional information from the third email. For instance, the email-security system 102 may harvest additional information, such as at least one of bank account information associated with the sending user, a phone number associated with the sending user, a digital wallet associated with the sending user, an alternate email address associated with the sending user, or geolocation information indicating a geolocation associated with the sending user.

Figure 9:
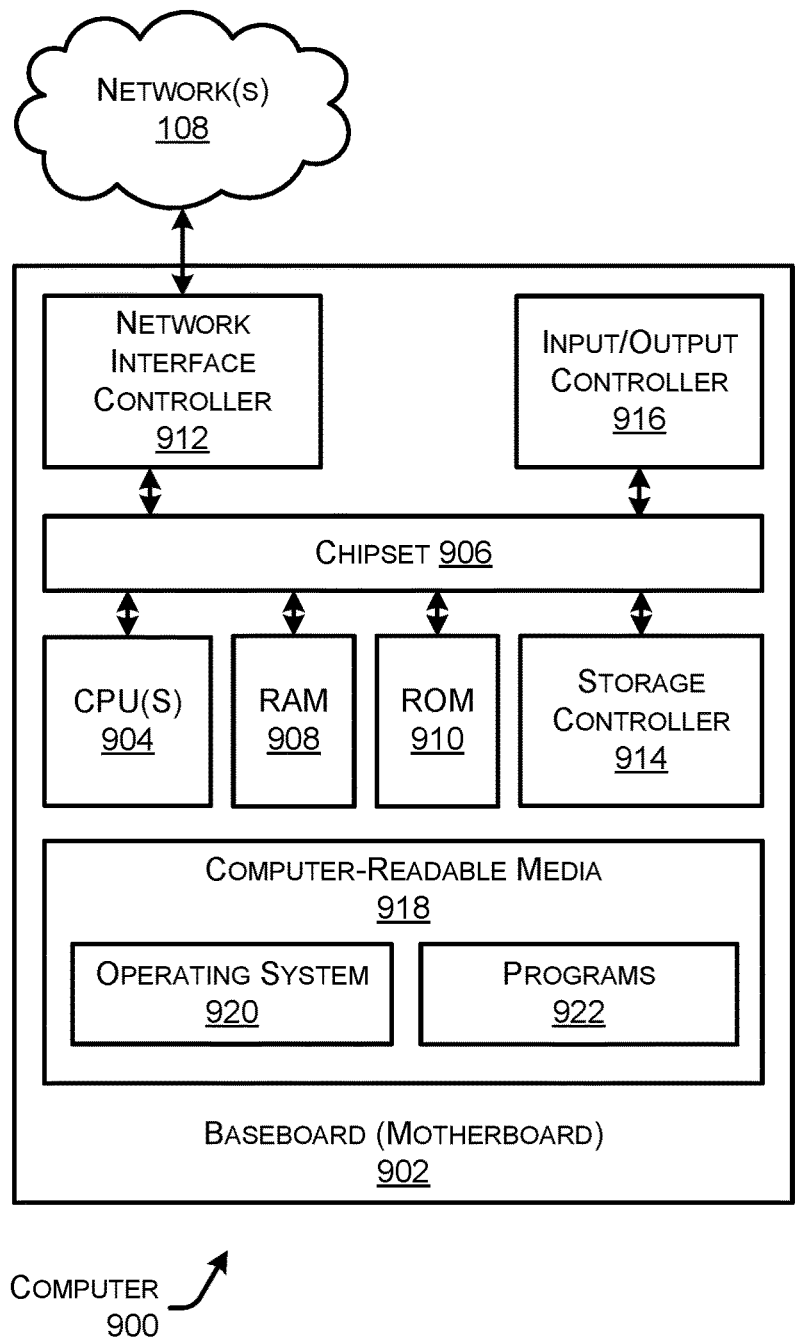
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to a physical server that is included in the email security-system 102 described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 608. The chipset 906 can include functionality for providing network connectivity through a NIC 912, such as a gigabit Ethernet adapter. The NIC 912 is capable of connecting the computer 900 to other computing devices over the network 608. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by devices in the distributed application architecture 102, and or any components included therein, may be supported by one or more devices similar to computer 900. Stated otherwise, some or all of the operations performed by the email-security system 102, and or any components included therein, may be performed by one or more computer devices 900 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-8. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for an email-security system to detect scam emails, the method comprising:
    obtaining, at the email-security system, a first email sent from a sending email address and to a targeted email address;
    determining, at the email-security system, that the first email is a scam email that is a scam directed at a targeted user associated with the targeted email address;
    classifying the scam email into a particular scam-email class from amongst a group of scam-email classes;
    determining, based at least in part on the particular scam-email class, additional information that is unique to a sending user associated with the sending email address in order to complete the scam;
    determining a response that prompts the sending user for the additional information needed to perform the scam;
    sending, to the sending email address, a second email that includes the response that prompts the sending user for the additional information associated with the scam;
    receiving, from the sending email address, a third email that includes the additional information associated with the scam;
    harvesting the additional information from a body of the third email;
    generating a rule to block subsequent emails based on bodies of the subsequent emails including the additional information that is unique to the sending user;
    identifying the additional information in a second body of a subsequent email sent to a second targeted email address; and
    based at least in part on the rule, preventing the subsequent email from being sent to a second inbox of the second targeted email address.

2. The method of claim 1, wherein group of scam-email classes includes at least two of:
    a gift-card scam class;
    a wire-transfer scam class;
    a payroll-account scam class;
    an invoice scam class;
    an account-acquisition scam class;
    a W-2 scam class;
    an aging report scam class;
    a merger and acquisition scam class;
    an executive forgery scam class;

an attorney scam class;
a tax client scam class;
an initial lure or rapport scam class; or
a phone scam class.

3. The method of claim 1, wherein determining that the first email is a scam email includes:
analyzing the first email using a rule-based, heuristic, or probabilistic algorithm to detect that the first email is the scam email; and
analyzing the first email using a machine-learning (ML) algorithm to detect that the first email is the scam email.

4. The method of claim 1, further comprising populating the second email with the targeted email address such that the second email appears to have been sent by the targeted user associated with the targeted email address.

5. The method of claim 1, further comprising:
identifying, from at least one of the first email or the third email, contact information associated with at least one of the sending user or the sending email address; and
generating a second rule to block subsequent emails having the contact information.

6. The method of claim 1, wherein the additional information includes at least one of:
bank account information associated with the sending user;
a phone number associated with the sending user; or
a digital wallet associated with the sending user.

7. The method of claim 1, further comprising in response to determining that the first email is a scam email, quarantining the first email by refraining from sending the first email to an inbox of the targeted email address.

8. The method of claim 1, wherein determining the response includes at least one of:
utilizing a machine-learning (ML) system trained to simulate conversations with users to generate the response based at least in part on content in a body of the first email; or
selecting the response from a response space of predefined responses based at least in part on the response being responsive to the particular scam-email class.

9. A system comprising:
one or more processors; and
one or more non-transitory computer-readable media storing computer-executable instructions that, when executed by the one or more processors, cause the one or more processors to perform operations comprising:
obtaining, a first email sent from a sending email address and to a targeted email address;
determining that the first email is a scam email that is a scam directed at a targeted user associated with the targeted email address;
classifying the scam email into a particular scam-email class from amongst a group of scam-email classes;
determining, based at least in part on the particular scam-email class, additional information that is unique to a sending user associated with the sending email address in order to complete the scam;
determining a response that prompts the sending user for the additional information needed to perform the scam;
sending, to the sending email address, a second email that includes the response that prompts the sending user for the additional information associated with the scam;
receiving, from the sending email address, a third email that includes the additional information associated with the scam;
harvesting the additional information from a body of the third email;

generating a rule to block subsequent emails based on bodies of the subsequent emails including the additional information that is unique to the sending user;
identifying the additional information in a second body of a subsequent email sent to a second targeted email address; and
based at least in part on the rule, preventing the subsequent email from being sent to a second inbox of the second targeted email address.

10. The system of claim 9, wherein group of scam-email classes includes at least two of:
a gift-card scam class;
a wire-transfer scam class;
a payroll-account scam class;
an invoice scam class;
an account-acquisition scam class
a W-2 scam class;
an aging report scam class;
a merger and acquisition scam class;
an executive forgery scam class;
an attorney scam class;
a tax client scam class;
an initial lure or rapport scam class; or
a phone scam class.

11. The system of claim 9, wherein determining that the first email is a scam email includes:
analyzing the first email using a rule-based, heuristic, or probabilistic algorithm to detect that the first email is the scam email; and
analyzing the first email using a machine-learning (ML) algorithm to detect that the first email is the scam email.

12. The system of claim 9, the operations further comprising populating the second email with the targeted email address such that the second email appears to have been sent by the targeted user associated with the targeted email address.

13. The system of claim 9, the operations further comprising:
identifying, from at least one of the first email, the third email, or a subsequent email, contact information associated with at least one of the sending user or the sending email address; and
generating a second rule to block subsequent emails having the contact information.

14. The system of claim 9, wherein the additional information includes at least one of:
bank account information associated with the sending user;
a phone number associated with the sending user; or
a digital wallet associated with the sending user.

15. The system of claim 9, the operations further comprising in response to determining that the first email is a scam email, quarantining the first email by refraining from sending the first email to an inbox of the targeted email address.

16. The system of claim 9, wherein determining the response includes at least one of:
utilizing a machine-learning (ML) system trained to simulate conversations with users to generate the response based at least in part on content in a body of the first email; or
selecting the response from a response space of predefined responses based at least in part on the response being responsive to the particular scam-email class.

17. One or more non-transitory computer-readable media storing computer-executable instructions that, when executed by one or more processors, cause the one or more processors to perform operations comprising:
- obtaining, at an email-security system, a first email sent from a sending email address and to a targeted email address;
- determining, at the email-security system, that the first email is a scam email that is a scam directed at a targeted user associated with the targeted email address;
- classifying the scam email into a particular scam-email class from amongst a group of scam-email classes;
- determining, based at least in part on the particular scam-email class, additional information that is unique to a sending user associated with the sending email address in order to complete the scam;
- determining a response that prompts the sending user for the additional information needed to perform the scam;
- sending, to the sending email address, a second email that includes the response that prompts the sending user for the additional information associated with the scam;
- receiving, from the sending email address, a third email that includes the additional information associated with the scam;
- harvesting the additional information from a body of the third email;
- generating a rule to block subsequent emails based on bodies of the subsequent emails including the additional information that is unique to the sending user;
- identifying the additional information in a second body of a subsequent email sent to a second targeted email address; and
- based at least in part on the rule, preventing the subsequent email from being sent to a second inbox of the second targeted email address.

18. The one or more non-transitory computer-readable media of claim 17, the operations further comprising populating the second email with the targeted email address such that the second email appears to have been sent by the targeted user associated with the targeted email address.

19. The one or more non-transitory computer-readable media of claim 18, the operations further comprising:
- identifying, from at least one of the first email, the third email, or a subsequent email, contact information associated with at least one of the sending user or the sending email address; and
- generating a second rule to block subsequent emails having the contact information.

20. The one or more non-transitory computer-readable media of claim 17, wherein the additional information includes at least one of:
- bank account information associated with the sending user;
- a phone number associated with the sending user; or
- a digital wallet associated with the sending user.

* * * * *